July 4, 1939.     A. C. HARDY     2,165,167
PROCESS OF COLOR REPRODUCTION
Filed Sept. 4, 1936
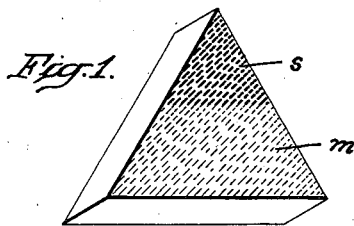
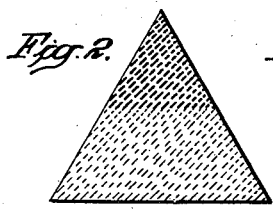 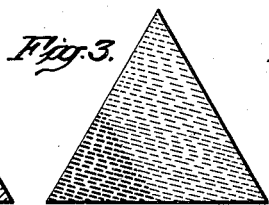 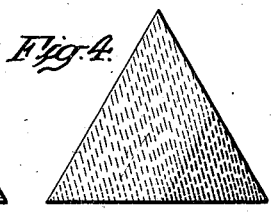
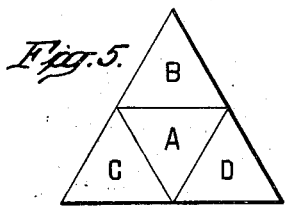
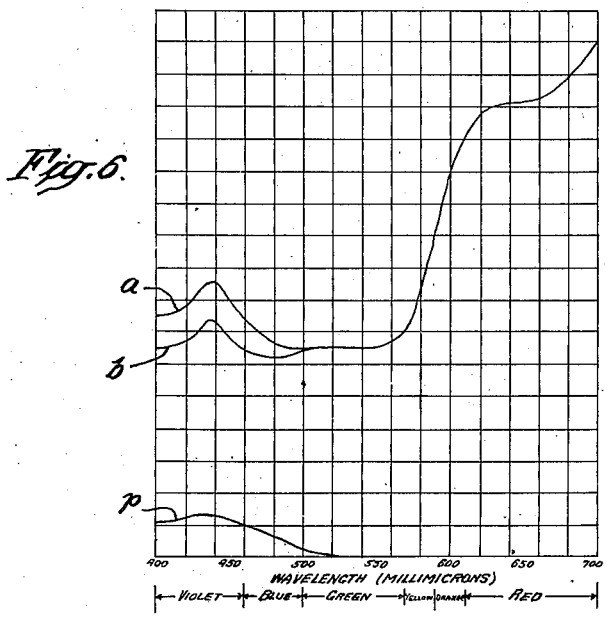
INVENTOR
ARTHUR C. HARDY
BY
ATTORNEY Patented July 4, 1939

2,165,167

UNITED STATES PATENT OFFICE 2,165,167

PROCESS OF COLOR REPRODUCTION

Arthur C. Hardy, Wellesley, Mass., assignor to Interchemical Corporation, a corporation of Ohio Application September 4, 1936, Serial No. 99,416

7 Claims. (Cl. 88—14)

This invention relates to processes of color reproduction and provides a method and means which makes possible the selection of the best receptors and the best colored materials for reproducing a particular subject.

As the terminology of colorimetry and color reproduction is not fixed, I will first define the sense in which various terms will be used in this application.

"Color" will be used in the abstract or optical sense and as so used should be understood to exclude pigments and other colored materials as well as the physiological sensation produced by color. A color has intensity and a spectral quality. The spectral quality of a color may be defined by its spectral energy distribution, that is, by the proportionate strength of radiations of different wave lengths which constitute the color. The spectral energy distribution of a color may be plotted as a curve whose abscissae represent different wave lengths and whose ordinates indicate the relative strength of radiation at each wave length. The spectral quality of a color determines the stimulus required to produce the same color sensation. The stimulus may be defined by two factors, dominant wave length and purity, or by factors termed "trichromatic coefficients".

The "primaries" of a color reproduction system are the colors of the colored lights which are mixed to give the observer a color sensation intended to duplicate the sensation which he would receive from colored light from the original subject.

A "color-separation image" is an image of the subject which is used to control one of the primaries in making a reproduction. In projection systems of color reproduction, the color-separation image may be a transparent positive which directly controls a colored light constituting one of the primaries. In systems of color reproduction used in the graphic arts, the color-separation images are formed upon or transferred to printing members, so that they control the primaries represented by the colored inks applied. Although color-separation images are not in themselves colored, they are frequently identified by the names of the colors of the primaries which they control. Thus the expression "red color-separation image" means a color-separation image to be used for controlling a primary whose dominant wave length is in the red part of the spectrum.

A "receptor" is a material or device which undergoes some change when subjected to radiant energy in the form of light and thus serves to make a record of the amount of light which it receives. The spectral sensitivity of a receptor is its relative response to light of different wave lengths and may be indicated by a curve in which the abscissae represent different wave lengths and the ordinates represent the relative extent to which the receptor is modified by radiation at each wave length.

As indicated in my co-pending application, Serial No. 99,415, filed September 4, 1936, the spectral qualities of the primaries of any system of color reproduction, and particularly the dominant wave length and purity of each primary or its trichromatic coefficients which are determined by its spectral quality, constitute data which may be used in connection with the standard-observer data published by the International Commission on Illumination to compute mathematically the spectral sensitivities of the color separation receptors which must be used in order to obtain correct color reproduction with these primaries. For this and other reasons hereinafter pointed out, it is essential to accurate color reproduction by any system to be able to identify the primaries of the system and determine their spectral qualities.

In some systems of color reproduction, the primaries are readily identifiable. Thus, in a reproduction made by projecting three images in different colors on a screen, the primaries are evidently the colors of the three separate lights used. The spectral quality of each primary can be determined by observation or measurement of the color produced on the screen by one of the lights when the other two are turned out. Furthermore, in this type of reproduction one colored light does not affect another and the primaries consequently remain fixed in spectral quality throughout the reproduction.

In other systems of color reproduction, including some systems used in color photography and practically all systems used in the graphic arts, the primaries are not so easily identified. In the case of subtractive processes, there has been heretofore no correct method for the identification of the primaries. In such processes, as, for example, letterpress printing, color reproduction has been developed, and is still practiced, empirically and inaccurately—usualy on the assumption that the primaries are the three colors complementary to three individual inks used.

I have found that this common assumption diverges widely from the actual facts encountered in color reproduction by subtractive processes. In such processes, it is not true that the three colors used do not affect one another. On the contrary, colored materials, such as dyes and pigments, when applied to the same area in any of the ordinary reproduction processes, affect one another's color to such an extent that the spectral qualities of the primaries do not remain fixed throughout the reproduction, but vary in different areas to which different proportions of the three colored materials have been applied. It follows that the primaries for no part of the reproduction can be identified or determined by merely examining separately each of the individual colored materials used.

I have discovered that the primaries of any system of color reproduction may be determined for any area of the reproduction by comparing the color produced by the combination of the three colored materials in the density in which each of them is used in the area in question with the colors of three other combinations of the three colored materials, in each one of which two of the colored materials have the same density as in the area in question and the third colored material has a density differing slightly from its density in the area in question.

I have invented a practical method based on this discovery for determining the primaries of any system of color reproduction and thus making it possible both to select the best color filters and to select the best colored materials for reproducing particular subjects as well as for reproduction in general. This has heretofore been impossible in subtractive systems of color reproduction.

As a specific example of my invention, I will describe in detail a method of determining the primaries in letterpress reproduction by means of half-tone plates. An apparatus for convenience in carrying out this specific method is diagrammatically illustrated in the accompanying drawing, in which:

Fig. 1 shows a triangular half-tone plate;

Figs. 2, 3 and 4 show three impressions from the plate shown in Fig. 1;

Fig. 5 shows a print made by superimposing the three impressions shown in Figs. 2, 3 and 4; and Fig. 6 is a graph of spectral energy distribution or spectrophotometric curves showing spectrophotometric subtraction.

The apparatus consists of a set of half-tone plates such as that shown in Fig. 1. Each plate has the form of an equilateral triangle having two areas adapted to print different densities or tones of an ink applied to the plate. These areas are provided with the usual half-tone dots, but the density of the dots differs slightly in the two areas. The density of the dots or "dot density" I define as the proportion or percentage of any given area which is covered with ink by printing from the series of dots in question. Each plate has a main area $m$ of one dot density and a small area $s$ of a different dot density. The area $s$ is an equilateral triangle at one corner of the plate having an area equal to one-quarter of the area of the whole plate. A set of such plates, each having the form indicated in Fig. 1, may be provided for different dot densities; the less the difference in dot density between the plates of the set the more accurate the results which can be obtained. For practical work, I find it convenient to provide a set of plates like that shown in Fig. 1, whose dot densities are specified in the following table:

| | Dot density of main area ($m$) | Dot density of small area ($s$) |
|---|---|---|
| Plate 1 | 0 | 8 |
| Plate 2 | 10 | 18 |
| Plate 3 | 20 | 28 |
| Plate 4 | 30 | 35 |
| Plate 5 | 40 | 45 |
| Plate 6 | 50 | 56 |
| Plate 7 | 60 | 66 |
| Plate 8 | 70 | 78 |
| Plate 9 | 80 | 88 |

I will now give a number of specific examples of the use of my method by means of these plates.

I will first give an example of the use of my method for determining the spectral sensitivities of the color separation receptors which should be used in reproducing a particular subject:

The first step consists in determining the densities in which the three colored inks which are to be used in making the reproduction must be combined in order to reproduce the color of an area of the subject which has been selected as the area in which the exact color reproduction is most important. This can be determined by inspection of the selected area in question by one accustomed to making half-tone color reproductions, or it may be determined empirically by making prints containing superimposed impressions of the three colored inks from plates of various different dot densities until a print is obtained which matches the color of the selected area of the subject. In the empirical method, the prints are made under conditions the same as those under which the reproduction is to be printed.

For the sake of illustration, it will be assumed that in one or the other of these ways it is determined that the area of the subject in question may be matched, under the conditions under which the reproduction is to be printed, by superimposing impressions of a yellow ink from a plate having a dot density of 10, a magenta ink from a plate having a dot density of 60, and a blue-green ink from a plate having a dot density of 20.

The second step consists in making what may be termed a differential print. It may be carried out as follows: An impression is made with plate 2 inked with the yellow ink to be used. A superimposed impression is made with plate 7 inked with the magenta ink to be used. In making a second impression, plate 7 is rotated through an angle of 120° in a counterclockwise direction so that its base now forms the right side of the equilateral triangle. A third superimposed impression is made with plate 3 inked with the blue-green ink to be used in the reproduction. This plate is also rotated through an angle of 120° but in a clockwise direction so that its base forms the left side of the equilateral triangle.

The three impressions are shown separately in Figs. 2, 3 and 4 in order to indicate the way in which the three plates are turned in making the impressions, although the impressions are, of course, not made as non-superimposed prints in carrying out the method. The differential print made by superimposing the three impressions shown in Figs. 2, 3 and 4 is shown diagrammatically in Fig. 5.

The reason for turning the plates in making the differential print is to place the screen lines of the different impressions at 30° angles to one another as is customary in color printing from half-tone plates in order to avoid moire effects. The other conditions to be present in printing the reproduction are also followed in making the differential print. Thus, the background condition to be present in the reproduction is followed by making the differential print on the same paper or other surface as is to be used in the reproduction. If, in the reproduction, an impression in black ink is to be combined with the colored ink impressions (as in the process erroneously but commonly called a four-color process), then, in making the differential print, a black ink impression of the dot density of the black ink impression to be used in the reproduction of the area in question is combined with the three colored ink impressions.

The differential print, as shown in Fig. 5, consists of four differently colored prints or triangular areas A, B, C and D in which the dot densities of the three colored inks are as follows:

| Area | Dot density of yellow ink | Dot density of magenta ink | Dot density of blue-green ink |
|---|---|---|---|
| A | 10 | 60 | 20 |
| B | 13 | 60 | 20 |
| C | 10 | 65 | 20 |
| D | 10 | 60 | 23 |

It will be noted that the densities of the inks in the area A are those which were determined in the first step, so that the area A matches the area of the subject which was selected as that area in which perfect color reproduction was most important.

The third step consists in determining the primaries of the system for the area A. This is accomplished by comparing the colors of each of the areas B, C and D with the color of the area A. The color of the area B indicates the effect of adding to the combination of inks on the area A a small increment of yellow ink, which amounts to taking from the color of the area A a small quantity of blue light. This light is one of the primaries for the area A, namely, the blue primary. In order to determine the spectral quality of this primary most accurately, the spectral energy distribution curve of the area B is subtracted from the spectral energy distribution curve of the area A. Such a subtraction is indicated in Fig. 6 showing graphically two spectrophotometric or spectral energy distribution curves, $a$ and $b$, which may be regarded as defining the spectral qualities of white light reflected from the areas A and B. The result of subtracting the curve $b$ from the curve $a$ is shown in the curve $p$ whose ordinate at each wave length is the difference between the ordinate of the curve $a$ and the ordinate of the curve $b$ at that wave length. The curve $p$ is a spectrophotometric or spectral energy distribution curve of the blue primary indicating the spectral quality of this primary. Similarly, the spectral quality of the green primary for the area A is obtained by spectrophotometric subtraction of the color of the area C from the color of the area A, and that of the red primary for the area A by similar subtraction of the color of the area D from the color of the area A. The spectral qualities of the blue, green and red primaries for the area A will be found to differ, and in some cases to differ widely, from the spectral qualities of the blue, green and red which are complementary to the colors of the individual inks and which have heretofore erroneously been assumed to be the primaries of such a system of reproduction.

The smaller the difference in dot density between the two areas of each plate, the more accurate is the determination of the spectral quality of the primaries for the area in question. For practical work, however, the difference in dot density must be sufficiently great to produce measurably different colors in the area A and the areas B, C and D. It is preferably sufficiently great to produce visible differences in color, for, after sufficient training, an expert can obtain information as to the nature of the primaries by visible comparison of the areas B, C and D with the area A without the necessity of spectrophotometric subtraction.

It should be noted that the intensities of the primaries determined in this manner increase with an increase in the difference in dot density between the two parts of each plate; but the other characteristic of each primary, namely, its spectral quality which determines its dominant wave length and purity and its trichromatic coefficients, is not appreciably affected by changes in this difference so long as the difference is small. The intensity of the primaries is immaterial, except for facilitating observation and measurement of the primaries, since it is a factor which is not used in determining the spectral sensitivities of the color separation receptors required by the primaries.

From the spectral qualities of the primaries determined by the method described, the spectral energy distribution of the color separation receptors which should be used to give perfect color reproduction in the area in question may be determined by calculation, and the effect of the receptors theoretically necessary insofar as they have negative sensitivities in part of the spectrum may be simulated by the method described in my co-pending application, Serial No. 99,415, filed September 4, 1936. In this way, a set of color separation half-tone plates may be made which will give accurate color reproduction in the area in question.

I will next give an example of the use of my method in selecting an ink for color reproduction. In this example, it will be assumed that a standard magenta ink and a standard blue-green ink are to be used, and that it is desired to select the better of two apparently equally desirable yellow inks. The procedure is as follows:

Using the first of the two yellow inks with the two standard inks, the primaries are determined for a number of different density combinations of the three inks, for example, the following combinations:

| Combination | Dot density of yellow ink | Dot density of magenta ink | Dot density of blue-green ink |
|---|---|---|---|
| 1 | 70 | 0 | 0 |
| 2 | 0 | 70 | 0 |
| 3 | 0 | 0 | 70 |
| 4 | 70 | 70 | 0 |
| 5 | 0 | 70 | 70 |
| 6 | 70 | 0 | 70 |
| 7 | 10 | 10 | 10 |
| 8 | 70 | 70 | 70 |

The primaries for the first six combinations may be determined from superimposed impressions of the three colors from plates 1 and 8. For the seventh combination, each ink is printed from plate 2, and for the eighth, each ink is printed from plate 8. It should be noted that the colors of the first six combinations are comparatively pure but differ widely in dominant wave length, while the colors of the seventh and eighth combinations are grays of different strengths. The eight combinations thus represent colors of a wide variety in dominant wave length and purity.

The spectral qualities of the three primaries for each of these eight combinations are determined by subtraction in the manner already described.

The entire procedure is then repeated, using the second of the two yellow inks with the two standard inks, and the spectral qualities of the three primaries for each of the eight combinations are determined in the same way.

The two sets of primaries are then compared to ascertain how far the eight values in each set depart from uniformity in the factors of dominant wave length and purity. The yellow ink which produced the more uniform set of primaries is then selected as that which, when used with the standard magenta and blue-green inks, will give the better reproduction over the whole gamut of colors.

The two examples given are merely illustrative of uses which may be made of my invention. Thus, the invention may be used to determine the spectral qualities of the primaries for a number of particularly important or dominant areas in a particular reproduction, and the results may be used both to determine the spectral sensitivities of the color separation receptors which should be used and to select the best inks for reproducing the particular subject.

The particular illustrative methods which have been described may be varied in many particulars. Thus, plates of different dot densities from plates 1 to 8 may be used, and the difference in dot density between the two parts of each plate may be different from those given in the specific example. In general, it is desirable that the difference in dot density between the two parts of a plate should be larger in the case of the plates of higher dot density than those of lower dot density, but this is not essential. The form of the plates may also be varied, although, as above pointed out, there is an advantage in half-tone work in using the triangular form.

The method may be applied to processes of color reproduction other than the letterpress half-tone method. Those skilled in the art will readily understand how to control the density of the three colored materials used in any process of color reproduction. Thus, for example, in gravure the density would be determined by film thickness, and in dye processes, by dye concentration. In all processes, my invention is applied by making the color combinations for determining the primaries in the same manner as that in which the colored materials are combined in making the actual reproduction; and the word "combination" as used in the claims which follow should be understood as limited to a combination so made.

What I claim is:

1. A method of ascertaining the spectral quality of a primary of a standard color reproduction system, which consists in making a combination in accordance with said system of the colored materials to be used in the reproduction in which each colored material has a selected density, making another combination of said colored materials in which all but one of the colored materials have the same density as in the first combination and that one colored material has a density sufficiently different from that which it had in the first combination to give the second combination a color measurably different from that of the first combination, measuring the spectral energy distribution of each of said colors, and subtracting the smaller of said two spectral energy distributions from the larger to obtain the spectral energy distribution of a primary of the reproduction system.

2. A method of ascertaining the spectral qualities of the primaries of a standard color reproduction system to obtain the data for computing the spectral sensitivity of color separation receptors for use in reproducing a particular subject, which consists in selecting the area of the subject in which exact color reproduction is most important, determining the density of each of three colored materials in a combination made in accordance with the system and matching the color of this area of the subject, making a second combination of the three colored materials in accordance with the system in which the first and second colored materials have the same density as in the first combination and the third colored material has a density sufficiently different from that which it had in the first combination to give the second combination a color measurably different from that of the first combination, making a third combination of the three colored materials in accordance with the system in which the first and third colored materials have the same density as in the first combination and the second colored material has a density sufficiently different from that of this colored material in the first combination to give the third combination a color measurably different from that of the first combination, making a fourth combination of the three colored materials in accordance with the system in which the second and third colored materials have the same density as in the first combination and the first colored material has a density sufficiently different from that of this colored material in the first combination to give the fourth combination a color measurably different from that of the first combination, measuring the spectral energy distribution of the colors of the four combinations, and subtracting the spectral energy distribution of the color of the first combination from the spectral energy distributions of the colors of each of the second, third and fourth combinations to obtain the spectral energy distribution of the three primaries of the reproduction system.

3. A method of selecting from a number of yellow, magenta and blue-green materials the ones capable of producing the best color reproduction, which consists in making a first set of combinations of one of the yellow materials, one of the magenta materials and one of the blue-green materials, the relative densities of these three materials being varied in the different combinations of the set so as to make the colors of the combinations widely different in dominant wave length and purity, ascertaining the spectral quality of each primary for each combination of the set by the method claimed in claim 1, making a similar second set of combinations of a yellow material, a magenta material and a blue-green material at least one of which was not used in making the first set of combinations, ascertaining the spectral quality of each of the primaries for each of the combinations of the second set by the method claimed in claim 1, and selecting the yellow, magenta and blue-green materials which were used in making the one of the two sets whose primaries are shown by their spectral qualities thus determined to be most nearly uniform in dominant wave length and purity.

4. A method of ascertaining the spectral quality of a primary of a system of color reproduction by printing, which consists in making a print consisting of superimposed impressions of a number of colored inks, making an additional print of superimposed impressions of the same colored inks in which all but one of the colored inks have the same density as they had in the first print and that one colored ink has a density sufficiently different from that which it had in the first print to make the color of the second print measurably different from the color of the first print, measuring the spectral energy distributions of the colors of said prints, and subtracting the smaller of said two spectral energy distributions from the larger to obtain the spectral energy distribution of a primary of the reproduction system.

5. A method of ascertaining the spectral quality of a primary of a system of color reproduction by printing from half-tone plates, which consists in making a first print by printing superimposed impressions of a number of colored inks, each of which is printed from a half-tone plate having a selected dot density, making a second print by printing three superimposed impressions of said colored inks in which all but one of the colored inks are printed from plates of the same dot density as the plates used for these inks in the first print and that one colored ink is printed from a plate having a dot density sufficiently different from that of the plate from which it was printed in the first print to make the color of the second print measurably different from the color of the first print, measuring the spectral energy distributions of the colors of said prints, and subtracting the smaller of said two spectral energy distributions from the larger to obtain the spectral energy distribution of a primary of the reproduction system.

6. A differential print for use in ascertaining the spectral qualities of the primaries of a standard system of color reproduction by printing with at least three differently colored inks, consisting of a base having a surface such as that used in said system carrying superimposed impressions of all the differently colored inks used in the system and having an area in which each of said inks has a selected density and a number of adjacent differently colored areas equal to the number of the colored inks, in each one of which all but one of the colored inks have the same densities as in the first area and that one ink has a density slightly different from that which it has in the first area, the ink whose density differs from its density in the first area being a different one of said inks in each of said differently colored areas.

7. A differential print for use in ascertaining the spectral qualities of the primaries of a standard system of color reproduction by printing with not less than three differently colored inks at a selected area of a subject to be reproduced, which consists of a base having a surface such as that used in said system carrying superimposed impressions of the differently colored inks used in the system and having an area whose color matches that of the selected area of the subject and a number of adjacent areas, in each one of which all but one of the colored inks of the reproduction system have the same density as in the first area and that colored ink has a density sufficiently different from that which it has in the first area to produce a measurable difference in color, the ink whose density is different from that in the first area being a different one of said inks in said different adjacent areas.

ARTHUR C. HARDY.